C. W. PATTEN.
AMALGAMATOR.
APPLICATION FILED JAN. 17, 1914.
1,139,067.
Patented May 11, 1915.
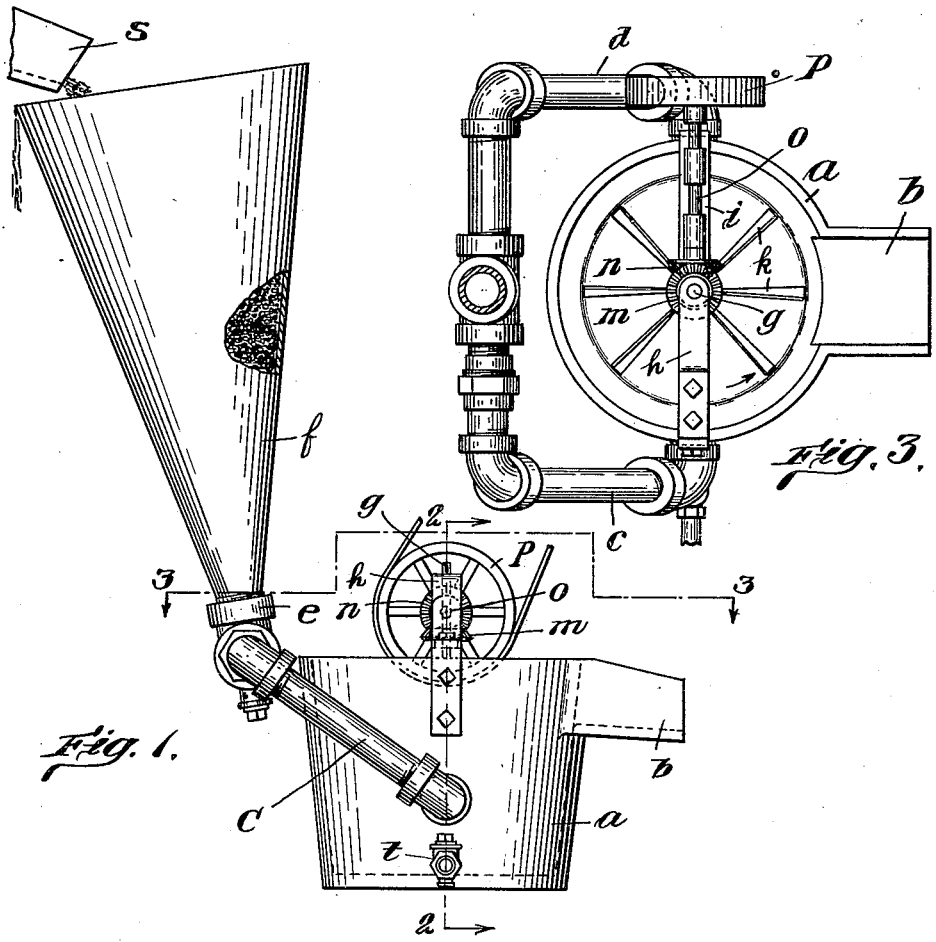
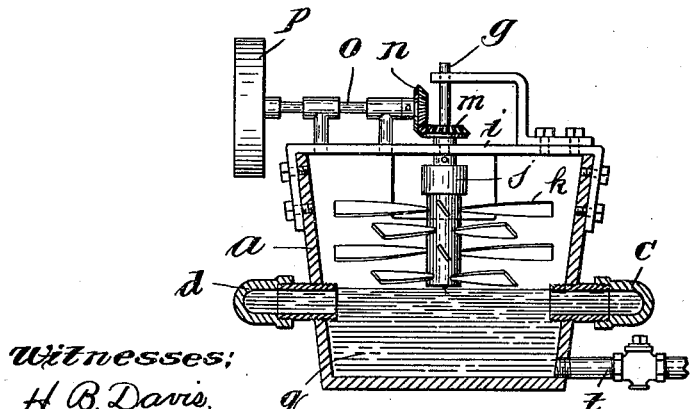
Witnesses:
H. B. Davis.
C. Doyle.
Inventor:
Charles W. Patten
by Ayres & Hanninan
Attys

UNITED STATES PATENT OFFICE.

CHARLES W. PATTEN, OF LYNN, MASSACHUSETTS.

AMALGAMATOR.

1,139,067.  Specification of Letters Patent.  Patented May 11, 1915.

Application filed January 17, 1914. Serial No. 812,615.

*To all whom it may concern:*

Be it known that I, CHARLES W. PATTEN, a citizen of the United States, residing at Lynn, in the county of Essex and State of Massachusetts, have invented an Improvement in Amalgamators, of which the following is a specification.

This invention relates to certain improvements in amalgamators and has for its object to provide an efficient device for this purpose which is of simple durable construction, and is readily portable, and with which the ore to be treated may be passed through the amalgamating liquid without appreciable loss of the latter. I accomplish this object by the means shown in the accompanying drawing, in which, Figure 1 is a side elevation of an amalgamator embodying my invention. Fig. 2 is a central vertical section thereof taken on the line 2—2, of Fig. 1. Fig. 3 is a plan view, partially in section, taken on the line 3—3, of Fig. 1.

As shown in the drawing, I provide a circular upwardly flaring receptacle $a$, open at its upper end and having an overflow opening or discharge spout $b$ a short distance below the upper edges of the sides thereof. Inlet pipes $c$ and $d$ are provided which are arranged to enter the receptacle through the side walls thereof, preferably at diametrically opposite points, and at a suitable distance above the bottom, and to project therein to some extent, said pipes $c$ and $d$ being connected to a common supply pipe $e$ into which a funnel-shaped reservoir $f$ leads.

A vertical shaft $g$ is mounted in bearings formed in brackets $h$ and $i$ and mounted on the walls of the receptacle, said shaft being centrally arranged with relation thereto. A sleeve $j$ is mounted on the lower end portion of said shaft $g$ and is arranged to extend downwardly to a point slightly above the level at which the pipes $c$ and $d$ enter said receptacle and a series of horizontally disposed blades $k$ are mounted in said sleeve, said blades being set at corresponding inclinations to their planes of rotation and extending to within a short distance of the sides of the receptacle, the uppermost of said blades being set approximately at the level of the overflow passage $b$, so that they move in horizontal planes above the level of the lower edge of said passage. Any suitable means for rotating the shaft $g$ may be provided, as the bevel gear $m$, meshing with a bevel gear $n$ on a driving shaft $o$ bearing a pulley $p$.

The receptacle $a$ is partly filled with the amalgamating fluid or mercury $q$, so that the level thereof is slightly below the plane of movement of the lowermost blades and above the points where the pipes $c$ and $d$ enter the receptacle, and the ends of said pipes are sealed by said fluid. The pulverized or disintegrated ore, mixed with water, is discharged into the reservoir $f$, through a spout $s$, or by any other convenient means, and flows down through the pipes $c$ and $d$, said reservoir being so arranged that the hydraulic head which is secured, when it is full, is sufficient to overcome the pressure of the mercury, and to force it from the lower ends of said pipes, and then to force the mixture of ore and water, or pulp, into the body of mercury, so that it may rise to the surface of the mercury by reason of its smaller specific gravity. As the ore or pulp is delivered to the mercury and rises to its surface, the blade-carrying shaft $g$ will be rapidly rotated in the direction to cause the inclined blades $k$ to have a lifting or elevating effect, and to tend to cause an upward current in the receptacle, thereby acting in the manner of a screw-propeller, which the rotary device may be termed. As the lowermost blades are moved in close proximity to the surface of the mercury, in a plane parallel to said surface, they will act to skim the solid material from said surface as fast as it rises thereabove. The blades between the upper and lower blades are arranged at sufficiently frequent intervals, so that each receives the solid material from the blades below, and delivers it to the blades above. Therefore, the material, which is removed from the surface of the mercury by the lower blades, will be carried upward from one blade to the next, to the upper blades, until it is raised thereby above the lower edge of the overflow outlet, over which it will be discharged with the outflowing water.

The blades act not only to lift mechanically the material from the mercury to the overflow, as above described, but also act to accelerate the flow of water up through the receptacle, primarily, induced by the head of water, so that the action of the water, in assisting to remove the material which has been treated, is greatly augmented, as water, when caused to flow rapidly, will carry up solid matter under these conditions, when it would not, if the flow were slow. While the blades tend principally to force, or throw the material upwardly, they also have a tendency to throw it outwardly, and it is inexpedient, and undesirable, not to provide a substantial space for clearance between the ends of the blades and the inner walls of the receptacle, so that there is a tendency for the material to collect in this space. I have ascertained, from practical tests, that, if the sides of the receptacle are vertical, the material will tend to collect adjacent the walls, and settle back onto the surface of the mercury, but have discovered that, by forming said sides, so that the surface thereof is of inverted conical form, or so that it flares outwardly from the bottom, this tendency is, to a substantial extent, neutralized, as the outwardly flaring walls act as a partial support for the material, so that the upward current of water, which is the only force which can act on the material in this space, to carry it upward, does not have to lift it entirely, but may roll it up the inclined surface, thus provided, while partly supported thereon, with the result that the effectiveness of the current in removing solid matter in this space is greatly increased. The tendency of the blades to throw the material outwardly, due to centrifugal action, is also an important factor in effecting a rapid discharge of the material over the edge of the overflow outlet, the extent of which edge, about said receptacle, is immaterial, as it will be understood that the discharge is directed, as shown, only as a matter of convenience. For this reason, when the material is raised above the level of said edge, it will not only be carried over said edge by the current of water, but it will also be forcibly thrown or swept thereover, by the upper blades, which operate in a horizontal plane above the level of said edge, so that the receptacle is freed of the heavy matter as fast as it is raised above the level of said edge.

The specific arrangement above described is particularly essential, in order that the material delivered to the amalgamator may, after it has been treated, be rapidly and effectively removed therefrom to avoid choking, and to enable a much larger quantity of ore to be effectively treated in a given time than would be possible if the elevating or propelling blades were not employed, and, what is more important, to prevent the mercury from being discharged with the material and lost, together with the precious metal which may have become combined with it. If, for example, the upper blades of the propeller were removed, the heavier granular material would not be positively raised to the level of the overflow and would settle back onto the surface of the mercury and would accumulate thereon, out of the path of the lower blades, until its weight became sufficient to cause the level of the mercury to be depressed at that point and correspondingly raised at another, to such an extent that the lower blades would pick up the mercury and mix it with the material, and thus cause the mercury to be discharged therewith from the overflow. It is, therefore, practically necessary that the blades positively carry the material to, and above the lower edge of the overflow, where the upper blades, partly from their centrifugal action, may sweep it, or throw it with the water, over said edge and from the receptacle and thus prevent the heavier particles of the material from falling back and choking the lower blades, or tending to force the mercury up into the path of the blades, as above explained. While the primary function of the blades is to elevate and remove the material from the receptacle and to prevent the settling of the material onto the surface of the amalgamating fluid, said blades, by being separated, and having substantial clearance space therebetween, also have a mixing action, as they tend to break up lumps in the material, so that it becomes thoroughly mixed with water, and particles of gold, or silver, which may have passed through the mercury without becoming amalgamated, may be liberated, and fall back to the surface of the mercury and become combined therewith.

By arranging the inlet pipes so that the solid material will be delivered to the receptacle at oppositely disposed points, not only is a substantially uniform distribution of the ore, within the mercury, secured, so that the amalgamating action may be more effective, and better distributed throughout the same, but the material will be caused to rise to the surface of the mercury over substantially its entire area, with the result that, when the material is engaged by the lower blades, the opposite portions of said blades will be nearly equally loaded, so that all parts of the propeller will be uniformly effective in elevating the material and mixing it with the water or breaking up lumps therein. The whole operation is thus better equalized, and rendered more effective. Large quantities of pulp may thus be rapidly and effectively treated in a comparatively small device, which may be readily transported, and this may be accomplished without loss of the amalgamating fluid to any substantial extent.

In case the mixed water and ore is supplied to the reservoir at a faster rate than that at which it is discharged, it will overflow therefrom, so that the head cannot be increased beyond a certain point, and, therefore, the force and rapidity with which the ore is delivered may be kept constant and cannot be made too rapid for satisfactory results, or so rapid as to cause the mercury to be carried away with the tailings.

The operation thus described may be carried on until it is necessary to remove the amalgam, which may be drawn off through an outlet pipe *t* at the bottom of the receptacle, so that a fresh supply of mercury may be introduced.

I claim:—

1. An amalgamator comprising a receptacle arranged to permit side overflow at its top and to contain an amalgamating fluid in its bottom portion, means to deliver a mixture of water and solid material to said fluid below the surface thereof, to permit it to pass therethrough to said surface, and a screw-propeller mounted to rotate about a vertical axis within said receptacle, with its lower portion above and in immediate unobstructed proximity to the normal level of the amalgamating fluid and its upper portion above the level of the overflow edge of the receptacle, to receive the material as it rises from said fluid, elevate it to points above said edge, and accelerate its discharge thereover, by centrifugal action.

2. An amalgamator comprising a receptacle arranged to permit overflow at its top and to contain an amalgamating fluid in its bottom portion, means to deliver a mixture of water and solid material to said fluid below the surface thereof, to permit it to pass therethrough to said surface, and a screw-propeller mounted to rotate about a vertical axis within said receptacle, and composed of a series of adjacently spaced horizontally extending inclined blades, the lowermost of which are arranged to swing above and in immediate unobstructed proximity to said surface and the uppermost above the level of the overflow edge of the receptacle, the intermediate blades being arranged to propel the solid material from the lower to the upper blades, whereby said propeller may have an elevating and mixing action on the solid material.

3. An amalgamator comprising a circular receptacle having a side overflow outlet at its top and arranged to contain an amalgamating fluid in its bottom portion, means to force a mixture of water and solid material into said fluid, to permit it to rise to the surface thereof, and a series of horizontally extending, adjacently disposed, and similarly inclined blades mounted to rotate in said receptacle about a vertical axis disposed centrally thereof, the lowermost of said blades being arranged above and in immediate unobstructed proximity to said fluid level, and the uppermost above the overflow edge of said outlet, to permit said blades to elevate the material from said fluid and discharge it from said outlet by centrifugal action.

4. An amalgamator comprising a circular receptacle having a side overflow outlet at its top and arranged to contain an amalgamating fluid in its bottom portion, means to force a mixture of water and solid material into said fluid, to permit it to rise to the surface thereof, and a series of horizontally extending, adjacently disposed, and similarly inclined blades mounted to rotate in said receptacle about a vertical axis disposed centrally thereof, the lowermost of said blades being arranged adjacent and above said fluid level, and the uppermost above the overflow edge of said outlet, said receptacle having the inner surface of its side walls, above said fluid level, of inverted conical form to provide a partial support for the solid material, as it is carried upwardly to said outlet between the ends of the blades and said walls.

5. An amalgamator comprising a cylindrical receptacle having an outlet at its top, and arranged to contain an amalgamating fluid to a predetermined depth, a screw-propeller arranged centrally of said receptacle to rotate about a vertically disposed axis, in position to engage solid material, as it rises above the surface of the fluid and to elevate it to said outlet, supply pipes opening into said receptacle, below the surface of said fluid, at diametrically opposite points, and means to cause the material to be forced from said pipes simultaneously into the fluid, to permit it to pass freely through the fluid and rise to the surface thereof, to cause opposite portions of the propeller to be loaded thereby with approximate uniformity.

In testimony whereof, I have signed my name to this specification, in the presence of two subscribing witnesses.

CHARLES W. PATTEN.

Witnesses:
L. H. HARRIMAN,
H. B. DAVIS.

Copies of this patent may be obtained for five cents each, by addressing the "Commissioner of Patents, Washington, D. C."